(12) United States Patent
Wu et al.

(10) Patent No.: US 11,158,916 B2
(45) Date of Patent: Oct. 26, 2021

(54) PHASE SHIFTER AND LIQUID CRYSTAL ANTENNA

(71) Applicants: Beijing BOE Sensor Technology Co., Ltd., Beijing (CN); BOE Technology Group Co., Ltd., Beijing (CN)

(72) Inventors: Jie Wu, Beijing (CN); Tienlun Ting, Beijing (CN); Ying Wang, Beijing (CN); Xue Cao, Beijing (CN); Liang Li, Beijing (CN); Haocheng Jia, Beijing (CN); Cuiwei Tang, Beijing (CN); Peizhi Cai, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/635,253

(22) PCT Filed: Aug. 9, 2019

(86) PCT No.: PCT/CN2019/100031
§ 371 (c)(1),
(2) Date: Jan. 30, 2020

(87) PCT Pub. No.: WO2020/030129
PCT Pub. Date: Feb. 13, 2020

(65) Prior Publication Data
US 2021/0066772 A1    Mar. 4, 2021

(30) Foreign Application Priority Data

Aug. 10, 2018 (CN) .......................... 201810914320.6

(51) Int. Cl.
*H01P 1/18* (2006.01)
*H01Q 3/36* (2006.01)
(Continued)

(52) U.S. Cl.
CPC ............ *H01P 1/184* (2013.01); *G02F 1/1313* (2013.01); *G02F 1/134309* (2013.01); *H01Q 3/36* (2013.01)

(58) Field of Classification Search
CPC .. H01P 1/184; G02F 1/1313; G02F 1/134309; H01Q 3/36
See application file for complete search history.

(56) References Cited

U.S. PATENT DOCUMENTS 10,951,036 B2 * 3/2021 Donahue ................. H02M 5/40
2020/0366101 A1 * 11/2020 Lim ........................ H02J 3/381

FOREIGN PATENT DOCUMENTS

CN         106154603 A     11/2016
CN         106684551 A      5/2017
(Continued)

*Primary Examiner* — Dinh T Le
(74) *Attorney, Agent, or Firm* — Nath, Goldberg & Meyer; Joshua B. Goldberg

(57) ABSTRACT

A phase shifter and a liquid crystal antenna are provided. The phase shifter includes a first substrate and a second substrate opposite to each other, and a liquid crystal layer between the first substrate and the second substrate. The first substrate includes a first base plate and a first electrode at a side of the first base plate proximal to the liquid crystal layer. The second substrate includes a second base plate and a second electrode at a side of the second base plate proximal to the liquid crystal layer. The phase shifter further includes an auxiliary capacitor connected to the first electrode.

20 Claims, 7 Drawing Sheets

(51) Int. Cl.
*G02F 1/13* (2006.01)
*G02F 1/1343* (2006.01)

(56) References Cited

FOREIGN PATENT DOCUMENTS

| | | |
|---|---|---|
| CN | 107394318 A | 11/2017 |
| CN | 208818972 U | 5/2019 |
| JP | 2007082046 A | 3/2007 |

\* cited by examiner

PHASE SHIFTER AND LIQUID CRYSTAL ANTENNA

CROSS REFERENCE TO RELATED APPLICATIONS

This is a National Phase Application filed under 35 U.S.C. 371 as a national stage of PCT/CN2019/100031, filed Aug. 9, 2019, an application claiming the benefit of Chinese Application No. 201810914320.6, filed Aug. 10, 2018, the content of each of which is hereby incorporated by reference in its entirety.

TECHNICAL FIELD

The present disclosure relates to the field of communication technology, and in particular, to a phase shifter, a liquid crystal antenna, a communication device, and a method for operating a liquid crystal phase shifter.

BACKGROUND

A phase shifter is a device for adjusting and controlling a phase of an electromagnetic wave, and is widely applied to various communication systems, such as a satellite communication system, a phased array radar system, a remote sensing and telemetering system, and the like.

SUMMARY

Embodiments of the present disclosure provide a phase shifter and a liquid crystal antenna.

A first aspect of the present disclosure provides a phase shifter, including:

a first substrate and a second substrate opposite to each other, and a liquid crystal layer between the first substrate and the second substrate; wherein the first substrate includes a first base plate and a first electrode at a side of the first base plate proximal to the liquid crystal layer;

the second substrate includes a second base plate and a second electrode at a side of the second base plate proximal to the liquid crystal layer; and the phase shifter further includes an auxiliary capacitor connected to the first electrode.

In an embodiment, the first electrode includes a microstrip; and the second electrode includes a plurality of sub-electrodes arranged periodically, and an orthographic projection of the microstrip on the first base plate at least partially overlaps an orthographic projection of each of the plurality of sub-electrodes on the first substrate.

In an embodiment, the microstrip includes a plurality of transmission units periodically and sequentially arranged along a length direction of the microstrip, and any adjacent two of the plurality of transmission units define a slit;

a plurality of auxiliary electrodes, which are in one-to-one correspondence with a plurality of slits between every adjacent two of the plurality of transmission units, are arranged on a side of the second base plate proximal to the liquid crystal layer;

an orthographic projection of each of the plurality of auxiliary electrodes on the first substrate covers a corresponding slit and covers partial regions of two adjacent transmission units defining the corresponding slit; and each auxiliary electrode and the partial regions of the two adjacent transmission units covered by the orthographic projection of the auxiliary electrode on the first base plate form the auxiliary capacitor.

In an embodiment, the plurality of auxiliary electrodes and the plurality of sub-electrodes are in a same layer and include a same material.

In an embodiment, both a first pole piece and a second pole piece of each of a plurality of auxiliary capacitors respectively corresponding to the plurality of auxiliary electrodes are connected to the microstrip.

In an embodiment, both the first pole piece and the second pole piece of each of the plurality of auxiliary capacitors are connected to a same side of the microstrip.

In an embodiment, one of the plurality of auxiliary capacitors is in a region defined by orthographic projections of any adjacent two of the plurality of sub-electrodes on the first base plate.

In an embodiment, the first and second pole pieces of the plurality of auxiliary capacitors and the microstrip are an integrally formed structure.

In an embodiment, a length direction of each of the plurality of sub-electrodes and a length direction of the microstrip are perpendicular to each other.

In an embodiment, the first electrode includes a microstrip that includes a main body structure, the main body structure includes a first side and a second side arranged opposite to each other along a length direction of the main body structure; and a plurality of branch structures are connected to each of the first and second sides of the main body structure and are arranged periodically.

In an embodiment, the second electrode includes a pair of sub-electrodes; an orthographic projection of each sub-electrode of the pair of sub-electrodes on the first base plate partially overlaps an orthographic projection, on the first base plate, of each of the plurality of branch structures connected to a corresponding side of the main body structure.

In an embodiment, the main body structure includes a plurality of transmission units periodically and sequentially arranged along a length direction of the main body structure; any adjacent two of the plurality of transmission units define a slit; and each of the plurality of transmission units is connected with the branch structures;

a plurality of auxiliary electrodes, which are in one-to-one correspondence with a plurality of slits between every adjacent two of the plurality of transmission units, are arranged on a side of the second base plate proximal to the liquid crystal layer;

an orthographic projection of each of the plurality of auxiliary electrodes on the first base plate covers a corresponding slit and covers partial regions of two adjacent transmission units defining the corresponding slit; and each auxiliary electrode and the partial regions of the two adjacent transmission units covered by the orthographic projection of the auxiliary electrode on the first base plate form the auxiliary capacitor.

In an embodiment, the plurality of auxiliary electrodes and the pair of sub-electrodes are in a same layer and include a same material.

In an embodiment, a length direction of each of the plurality of branch structures at each of the first side and the second side of the main body structure is perpendicular to a length direction of the microstrip.

In an embodiment, the plurality of branch structures at the first side of the main body structure and the plurality of branch structures at the second side of the main body structure are symmetric about the main body structure.

In an embodiment, the phase shifter further includes a ground electrode on a side of the first base plate distal to the liquid crystal layer.

In an embodiment, a material of the first substrate includes at least one of glass, ceramic, and high-purity quartz glass.

In an embodiment, the liquid crystal layer includes positive liquid crystal molecules, and an angle between a long axis direction of each of the positive liquid crystal molecules and a plane where the first base plate is located is greater than 0 degree and equal to or less than 45 degrees.

In an embodiment, the liquid crystal layer includes negative liquid crystal molecules, and an angle between a long axis direction of each of the negative liquid crystal molecules and a plane where the first base plate is located is greater than 45 degrees and smaller than 90 degrees.

In an embodiment, the phase shifter is configured to phase shift a signal having a frequency in any one of a frequency band from 2 GHz to 5 GHz and a frequency band from 12 GHz to 18 GHz.

A second aspect of the present disclosure provides a liquid crystal antenna, which includes the phase shifter according to any one of the foregoing embodiments of the present disclosure.

DETAILED DESCRIPTION

Figure 1:
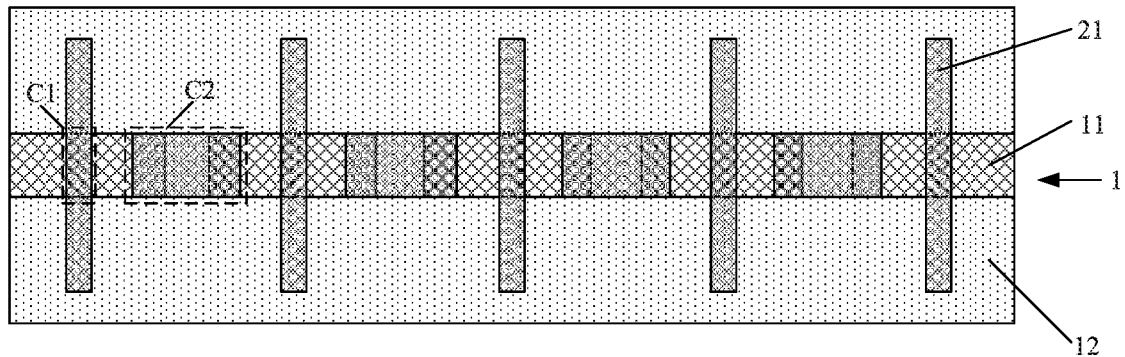
FIG. 1 is a top view of a phase shifter according to an embodiment of the present disclosure.

To enable one of ordinary skill in the art to better understand the technical solutions of the present disclosure, the present disclosure will be further described in detail below with reference to the accompanying drawings and exemplary embodiments.

Unless otherwise defined, technical terms or scientific terms used in the present disclosure (including embodiments and claims) should have the ordinary meaning as understood by one of ordinary skill in the art to which the present disclosure belongs. Terms such as "first", "second", and the like used herein do not denote any order, quantity, or importance, but to distinguish one element from another. The word "include", "comprise", or the like, means that the element or item preceding the word, having the element or item listed after the word and equivalents thereof, but does not exclude additional elements or items. The terms "connect", "couple", or the like is not limited to physical or mechanical connections, but may include electrical connections, regardless of direct or indirect connections. Terms such as "upper", "lower", "left", "right", and the like are used only for indicating relative positional relationships in the drawings, and when the absolute position of the object being described is changed, the relative positional relationships may also change accordingly.

It is to be understood that when an element such as a layer, film, region or substrate is referred to as being "on" or "under" other element, the element may be "directly on" or "directly under" the other element, or intervening elements may be present.

The inventors of the present inventive concept have found that, a microstrip (which may also be referred to as a microstrip line) included in a conventional phase shifter has a periodic transmission structure and a low-pass transmission characteristic, and may achieve the phase shifting effect by adjusting some parameters (e.g., a dielectric constant) of the microstrip. The conventional phase shifter has a large loss and a small phase shift amount per unit loss. Therefore, the conventional phase shifter has a large loss when achieving a large phase shift amount, thereby reducing the overall performance of a system including the phase shifter. Therefore, it is desirable to increase the phase shift amount per unit loss of the phase shifter.

An embodiment of the present disclosure provides a liquid crystal phase shifter, which includes a first substrate and a second substrate that are arranged opposite to each other, and a liquid crystal layer located between the first substrate and the second substrate. The first substrate may include a first base plate and a first electrode positioned at a side of the first base plate proximal to the liquid crystal layer. The second substrate may include a second base plate and a second electrode positioned at a side of the second base plate proximal to the liquid crystal layer. In this way, an electric field is formed between the first electrode and the second electrode after different voltages are applied thereto, respectively, to cause liquid crystal molecules in the liquid crystal layer to rotate, thereby changing a dielectric constant of the liquid crystal layer so as to change a phase of a microwave signal transmitted into the liquid crystal layer. In particular, in the present embodiment, the first electrode is further connected with an auxiliary capacitor, so as to reduce the overall loss of the phase shifter and increase the phase shift amount per unit loss of the phase shifter.

In order to make the structure of the liquid crystal phase shifter described above clearer, the phase shifter will be further described with reference to the following embodiments.

Figure 2:
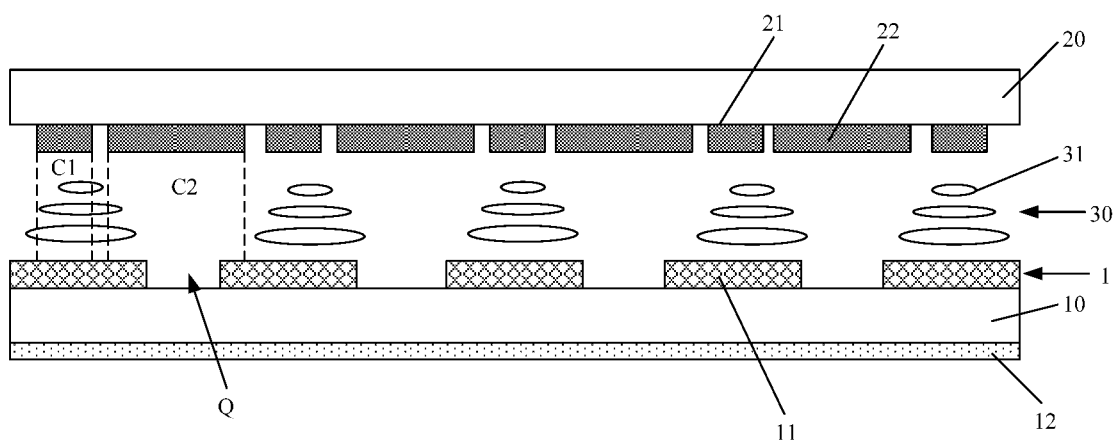
FIG. 2 is a side view of the phase shifter shown in FIG. 1.

As shown in FIGS. 1 and 2, an embodiment of the present disclosure provides a liquid crystal phase shifter including first and second substrates disposed opposite to each other, and a liquid crystal layer 30 between the first and second substrates.

The first substrate includes a first base plate 10, a first electrode at a side of the first base plate 10 proximal to the liquid crystal layer 30, and a ground electrode 12 at a side of the first base plate 10 distal to the liquid crystal layer 30. For example, the first electrode is a microstrip 1, the microstrip 1 includes a plurality of transmission units 11 arranged periodically and sequentially along a length direction of the microstrip 1, and a slit Q is defined between any adjacent two of the transmission units 11. That is, the plurality of transmission units 11 are arranged with an interval therebetween, and the interval may be constant (i.e., an interval between adjacent two of the plurality of transmission units 11 may be equal to an interval between other adjacent two of the plurality of transmission units 11).

The second substrate includes a second base plate 20, and a second electrode located at a side of the second base plate 20 proximal to the liquid crystal layer 30. The second electrode includes a plurality of sub-electrodes 21 arranged periodically, and an orthographic projection of each of the sub-electrodes 21 on the first base plate 10 at least partially overlaps an orthographic projection of the microstrip 1 (e.g., an orthographic projection of each transmission unit 11 of the microstrip 1) on the first base plate 10. The second electrode further includes a plurality of auxiliary electrodes 22 disposed at the side of the second base plate 20 proximal to the liquid crystal layer 30, and the plurality of auxiliary electrodes 22 may be in one-to-one correspondence with the plurality of slits Q between the plurality of transmission units 11, respectively. That is, each auxiliary electrode 22 corresponds to one slit Q on the first base plate 10. An orthographic projection of each auxiliary electrode 22 on the first base plate 10 covers the corresponding slit Q and covers partial regions of two adjacent transmission units 11 defining the slit Q. An auxiliary capacitor C2 is formed by the auxiliary electrode 22 and the partial regions of two adjacent transmission units 11 covered by the orthographic projection of the auxiliary electrode 22 on the first base plate 10, as shown in FIGS. 1 and 2.

It should be noted that, as shown in FIG. 1, each transmission unit 11 may be disposed opposite to one sub-electrode 21 for achieving a better effect, but the present disclosure is not limited thereto. For example, each transmission unit 11 may be disposed opposite to two or more sub-electrodes 21. For ease of description, in the present embodiment, description is made by taking a case where each transmission unit 11 is disposed opposite to one sub-electrode 21 as an example.

In the phase shifter according to the present embodiment, the microstrip 1 and the ground electrode 12 form a transmission structure for a microwave signal, such that a large part of the microwave signal is transmitted in the first base plate 10 and only a small part of the microwave signal is transmitted in the liquid crystal layer 30. In order to reduce the loss of the microwave signal during transmission, a material of the first base plate 10 may be glass, ceramic, or the like, which does not substantially absorb the microwave signal, thereby greatly reducing the loss of the microwave signal during transmission. When a first voltage is applied to the plurality of transmission units 11 and a second voltage different from the first voltage is applied to the plurality of sub-electrodes 21 and the plurality of auxiliary electrodes 22 of the phase shifter according to the present embodiment, an electric field is generated between a layer where the plurality of transmission units 11 are located and a layer where the plurality of sub-electrodes 21 are located. At the same time, each auxiliary electrode 22 and the corresponding two adjacent transmission units 11 form an auxiliary capacitor C2 due to the auxiliary electrode 22 at least partial overlapping the corresponding two adjacent transmission units 11 in a direction perpendicular to the first base plate 10 or the second base plate 20, and thus an electric field is also generated between the auxiliary electrode 22 and the corresponding two adjacent transmission units 11. The resultant electric field causes the liquid crystal molecules 31 of the liquid crystal layer 30 to rotate, thereby changing the dielectric constant of the liquid crystal layer 30 and achieving a phase shift of the microwave signal transmitted in the liquid crystal layer 30. The microwave signal in the liquid crystal layer 30 is then transmitted interactively with the microwave signal in the first base plate 10, such that a phase shift of the entire microwave signal is achieved. In other words, the large part of the microwave signal transmitted in the first base plate 10 and the small part of the microwave signal transmitted in the liquid crystal layer 30 may be subjected to a same phase shift.

Figure 3:
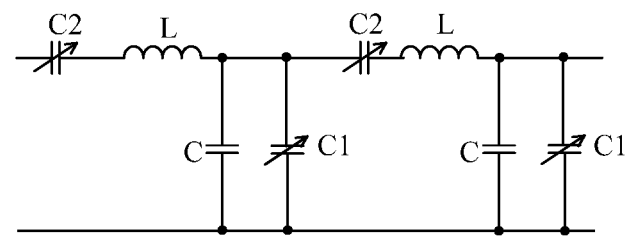
FIG. 3 is an equivalent circuit model of the phase shifter shown in FIGS. 1 and 2.

For example, each transmission unit 11 may be equivalent to an inductor L, and the transmission unit 11 and the corresponding sub-electrode 21 constitute a variable capacitor C1 due to overlapping of the transmission unit 11 and the corresponding sub-electrode 21 in the direction perpendicular to the first base plate 10 or the second base plate 20. Each auxiliary electrode 22 and the corresponding adjacent two transmission units 11 constitute an auxiliary capacitor C2 because the auxiliary electrode 22 overlaps the corresponding adjacent two transmission units 11 in the direction perpendicular to the first base plate 10 or the second base plate 20. In addition, each transmission unit 11 and the ground electrode 12 constitute an overlap capacitor C due to the transmission unit 11 overlapping the ground electrode 12 in the direction perpendicular to the first base plate 10 or the second base plate 20, as shown in FIG. 3. FIG. 3 is an equivalent circuit model of the phase shifter shown in FIGS. 1 and 2.

Figure 6:
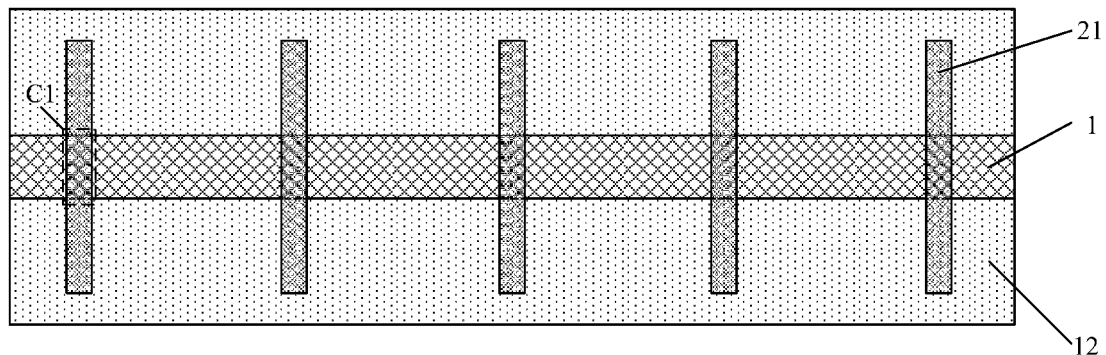
FIG. 6 is a top view of a phase shifter according to an embodiment of the present disclosure.
Figure 7:
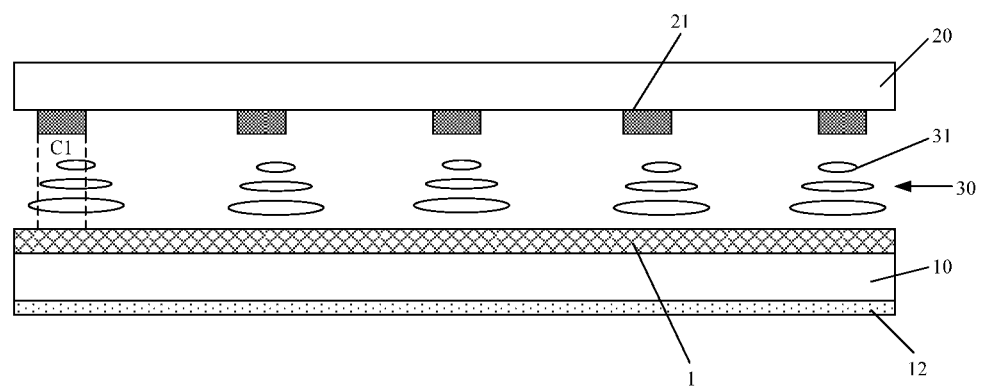
FIG. 7 is a side view of the phase shifter shown in FIG. 6.
Figure 8:
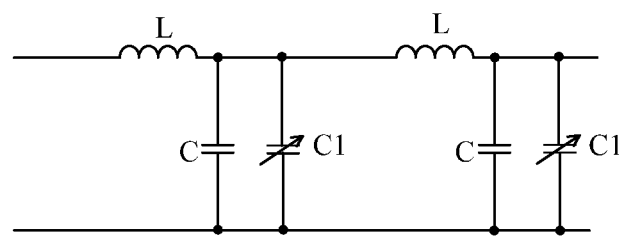
FIG. 8 is an equivalent circuit model of the phase shifter shown in FIGS. 6 and 7.

FIGS. 6 and 7 illustrate a phase shifter according to another embodiment of the present disclosure. The phase shifter includes a first substrate and a second substrate disposed opposite to each other, and a liquid crystal layer 30 interposed between the first substrate and the second substrate. The first substrate includes a first base plate 10, a microstrip 1 located at a side of the first base plate 10 proximal to the liquid crystal layer 30, and a ground electrode 12 located at a side of the first base plate 10 distal to the liquid crystal layer 30. The second substrate includes a second base plate 20, and a plurality of sub-electrodes 21 arranged periodically and positioned at the side of the second base plate 20 proximal to the liquid crystal layer 30. As described above, the microstrip 1 (e.g., a portion of the microstrip 1 located between the orthographic projections of any two adjacent sub-electrodes 21 on the first base plate 10) may be equivalent to the inductor L, the microstrip 1 overlaps each sub-electrode 21 to form the variable capacitor C1, and the microstrip 1 (e.g., the portion of the microstrip 1 located between the orthographic projections of any two adjacent sub-electrodes 21 on the first base plate 10) overlaps the ground electrode 12 to form the overlap capacitor C, as shown in FIG. 8. FIG. 8 is an equivalent circuit model of the phase shifter shown in FIGS. 6 and 7. For example, a length direction (e.g., the vertical direction in FIG. 1) of each of the plurality of sub-electrodes 21 and a length direction (e.g., the horizontal direction in FIG. 1) of the microstrip 1 are perpendicular to each other.

Figure 4:
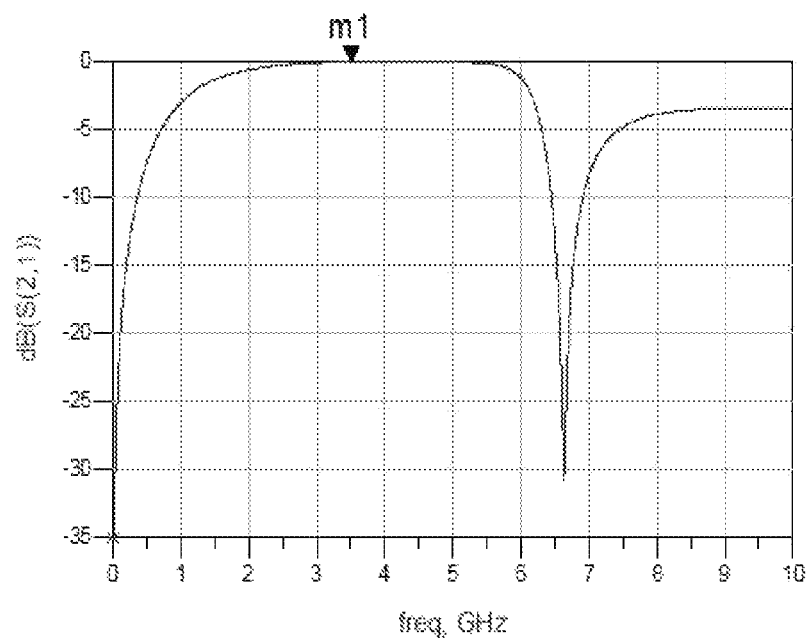
FIG. 4 is a graph showing transfer characteristics of the phase shifter shown in FIGS. 1 and 2 in a case where a variable capacitor of the phase shifter has a minimal capacitance.
Figure 5:
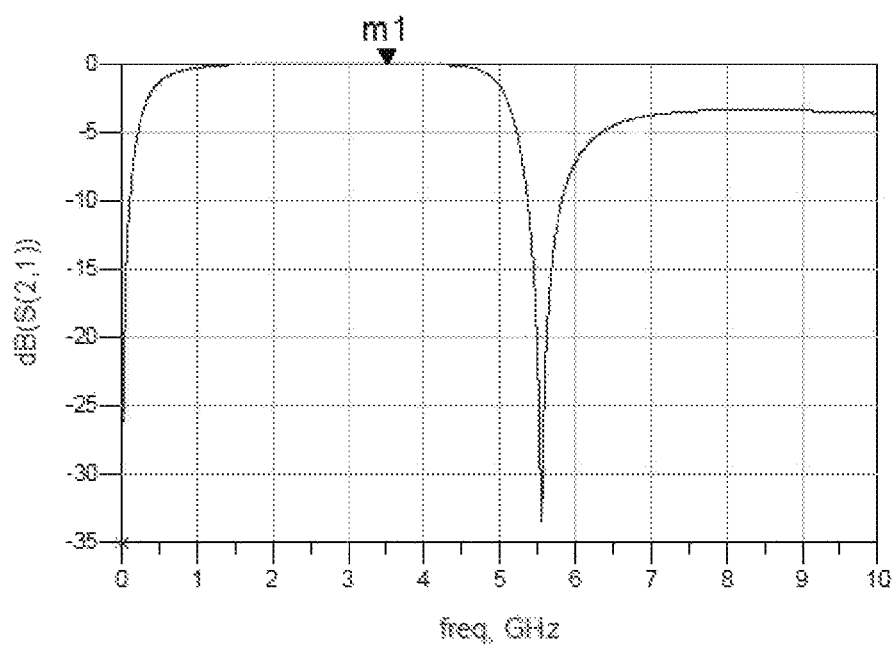
FIG. 5 is a graph showing transfer characteristics of the phase shifter shown in FIGS. 1 and 2 in a case where a variable capacitor of the phase shifter has a maximal capacitance.
Figure 9:
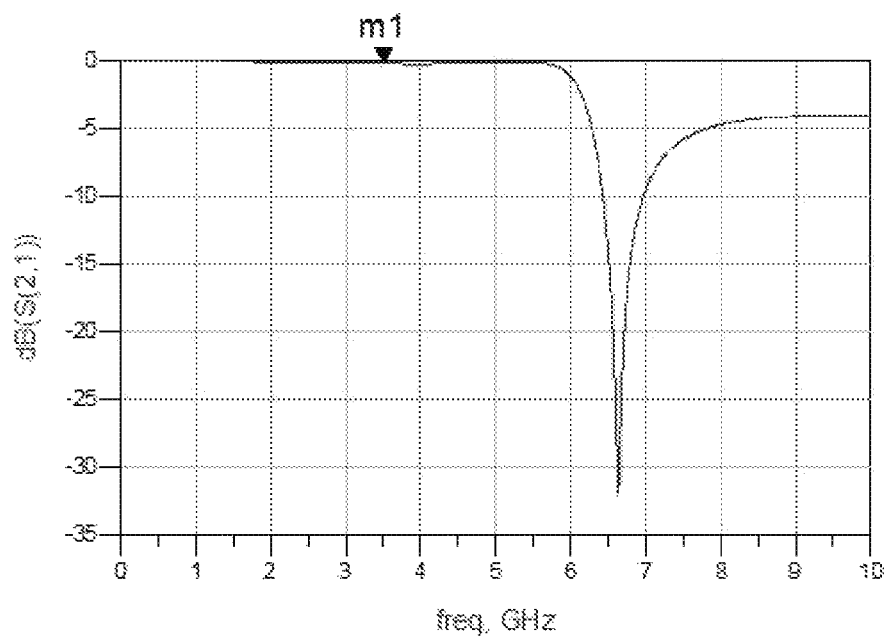
FIG. 9 is a graph showing transfer characteristics of the phase shifter shown in FIGS. 6 and 7 in a case where a variable capacitor of the phase shifter has a minimal capacitance.
Figure 10:
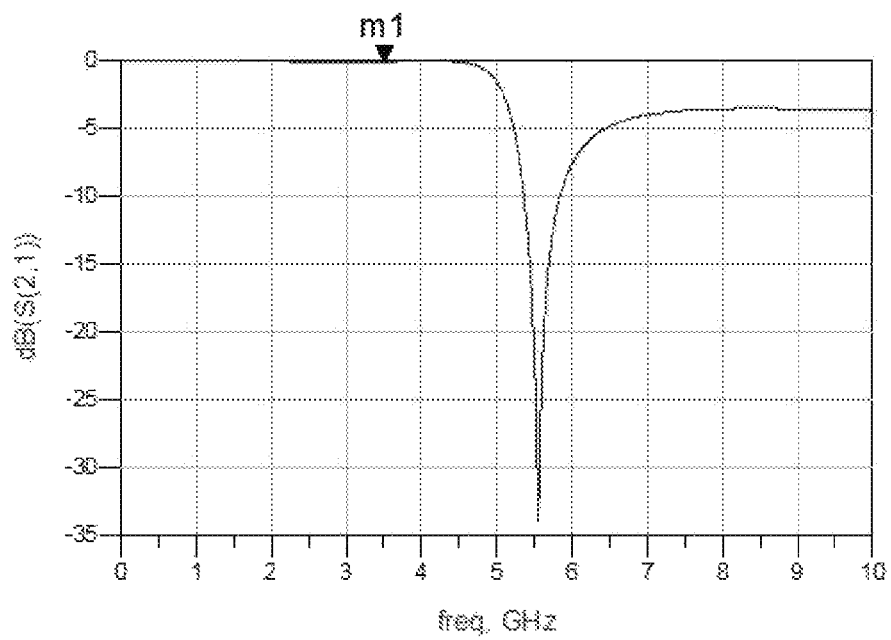
FIG. 10 is a graph showing transfer characteristics of the phase shifter shown in FIGS. 6 and 7 in a case where a variable capacitor of the phase shifter has a maximal capacitance.

It can be seen that, the equivalent circuit model (as shown in FIG. 8) of the phase shifter shown in FIGS. 6 and 7 forms a low pass filter, and the equivalent circuit model (as shown in FIG. 3) of the phase shifter shown in FIGS. 1 and 2 is equivalent to connecting an auxiliary capacitor C2 in series with the microstrip 1 of the phase shifter shown in FIGS. 6 and 7. Thus, the equivalent circuit model of the phase shifter shown in FIGS. 1 and 2 forms a combination of a low-pass filter and a high-pass filter, i.e., is equivalent to a band-pass filter. FIGS. 9 and 10 show transmission characteristic curves of the phase shifter shown in FIGS. 6 and 7 in operation, wherein FIG. 9 is a graph showing transmission characteristics of the phase shifter shown in FIGS. 6 and 7 in a case where the variable capacitor C1 has a minimal capacitance, and FIG. 10 is a graph showing transmission characteristics of the phase shifter shown in FIGS. 6 and 7 in a case where the variable capacitor C1 has a maximum capacitance. FIGS. 4 and 5 are graphs showing transmission characteristics of the phase shifter shown in FIGS. 1 and 2 in operation, wherein FIG. 4 is a graph showing transmission characteristics of the phase shifter shown in FIGS. 1 and 2 in a case where the variable capacitor C1 of the phase shifter shown in FIGS. 1 and 2 has a minimal capacitance, and FIG. 5 is a graph showing transmission characteristics in a case where the variable capacitor C1 of the phase shifter shown in FIGS. 1 and 2 has a maximum capacitance. Comparison of the losses (i.e., the decibel (dB) as shown by the vertical axes in the figures) of the phase shifter at points m1 (i.e., the operating frequency of the phase shifter) shown in FIGS. 4 and 9 shows that, FIGS. 4 and 9 both illustrate the losses of the phase shifter at the operating frequency of 3.5 GHz. Further, it can be seen that the loss of the phase shifter shown in FIGS. 1 and 2 at this operating frequency remains to be zero (0), whereas the operation loss in the phase shifter shown in FIGS. 6 and 7 starts to deviate from zero (0), i.e., the loss starts to occur. Similarly, by comparing FIGS. 5 and 10, it can be seen that the differences between FIGS. 10 and 5 are similar to the differences between FIGS. 9 and 4, and detailed description thereof will be omitted herein. In other words, the phase shifter shown in FIGS. 6 and 7 has a minimal loss when the frequency of a signal is zero, has an increased loss as the frequency increases (and thus, a high-pass filter may remove high-frequency components having relatively large loss in the range from 0 GHz to about 6.6 GHz in FIG. 4 and in the range from 0 GHz to about 5.5 GHz in FIG. 5, and may have a smaller loss some bands of higher frequencies. The transmission characteristic curves shown in FIGS. 9 and 10 correspond to shifting the zero frequency of the transmission characteristic curves shown in FIGS. 4 and 5 to the operating frequency m1 in FIGS. 9 and 10, respectively. Therefore, the phase shifter shown in FIGS. 1 and 2 can improve an adjustable range of the phase shifter and reduce the loss of the phase shifter in the operating frequency band, thereby increasing the phase shift amount per unit loss. For example, the phase shifter according to the present inventive concept can shift the phase of a signal in a frequency band from 1 GHz to 40 GHz by adjusting the structures and shapes of the first and second electrodes. For example, when the frequency of a signal is within a frequency band from 2 GHz to 5 GHz (in particular, from 3 GHz to 5 GHz) and a frequency band from 12 GHz to 18 GHz, the phase shifter according to the inventive concept has a small loss when performing phase shifting.

For example, in the phase shifter shown in FIGS. 1 and 2, the plurality of sub-electrodes 21 and the plurality of auxiliary electrodes 22 on the second base plate 20 may be disposed in a same layer, and may be made of a same material. In this case, the plurality of sub-electrodes 21 and the plurality of auxiliary electrodes 22 may be formed by one patterning process, thereby improving the production efficiency of the phase shifter effectively and saving the cost thereof.

For example, the slits Q between every pairs of adjacent transmission units 11 of the microstrip 1 shown in FIG. 1 and FIG. 2 may have same width, i.e., the plurality of transmission units 11 are arranged periodically with a constant interval therebetween. However, the periodic arrangement of the plurality of transmission units 11 is not limited thereto, and the plurality of transmission units 11 may also be arranged according to a preset arrangement rule.

For example, every adjacent two of the plurality of sub-electrodes 21 of the second electrode shown in FIG. 1 and FIG. 2 have a same interval, i.e., the plurality of sub-electrodes 21 are arranged periodically with a constant interval therebetween. However, the periodic arrangement of the plurality of sub-electrodes 21 is not limited thereto, and the plurality of sub-electrodes 21 may be arranged according to a preset arrangement rule.

For example, in the phase shifter shown in FIGS. 1 and 2, each transmission unit 11 may be disposed corresponding to at least one sub-electrode 21 (an example that each transmission unit 11 is disposed corresponding to one sub-electrode 21 is shown in the figures), and the length direction of each transmission unit 11 may be perpendicular to the length direction of the sub-electrode 21, so as to ensure that there is a sufficient large overlapping area between the transmission unit 11 and the sub-electrode 21. In this way, an electric field generated upon a voltage is applied across the transmission unit 11 and the sub-electrode 21 will cause the liquid crystal molecules 31 to rotate, thereby changing the dielectric constant of the liquid crystal layer 30, and achieving a phase shift of a microwave signal.

For example, in the phase shifter shown in FIGS. 1 and 2, each of the first base plate 10 and the second base plate 20 may be a glass substrate having a thickness of 100 μm to 1000 μm, a sapphire substrate, a polyethylene terephthalate substrate having a thickness of 10 μm to 500 μm, a triallyl cyanurate substrate, and/or a transparent flexible polyimide substrate. For example, each of the first base plate 10 and the second base plate 20 may be a high-purity quartz glass having extremely low dielectric loss. The first base plate 10 and/or the second base plate 20 made of the high-purity quartz glass may effectively reduce loss of the microwave, compared to a general glass substrate, such that the phase shifter may have low power consumption and a high signal-to-noise ratio.

For example, in the phase shifter shown in FIGS. 1 and 2, each of a material of each transmission element 11 of the microstrip 1, a material of the ground electrode 12, a material of each sub-electrode 21, and a material of each auxiliary electrode 22 may include aluminum, silver, gold, chromium, molybdenum, nickel, iron, or the like. Further, each transmission element 11 of the microstrip 1 may be made of a transparent conductive oxide.

For example, in the phase shifter shown in FIGS. 1 and 2, the liquid crystal molecules 31 of the liquid crystal layer 30 may be positive liquid crystal molecules 31 or negative liquid crystal molecules 31. It should be noted that, in a case where the liquid crystal molecules 31 are positive liquid crystal molecules 31, an angle between a long axis direction of each liquid crystal molecule 31 and a plane where the first base plate 10 or the second base plate 20 is located according to an embodiment of the present disclosure is greater than 0 degree and less than or equal to 45 degrees. In a case where the liquid crystal molecules 31 are negative liquid crystal molecules 31, the angle between the long axis direction of each liquid crystal molecule 31 and the plane where the first base plate 10 or the second base plate 20 is located according to an embodiment of the present disclosure is greater than 45 degrees and less than or equal to 90 degrees. With such configuration, the dielectric constant of the liquid crystal layer 30 will be changed after the liquid crystal molecules 31 are caused to rotate, thereby achieving the purpose of phase shifting.

As shown in FIGS. 11A to 13, an embodiment of the present disclosure provides a liquid crystal phase shifter including first and second substrates disposed opposite to each other, and a liquid crystal layer 30 located between the first and second substrates.

Figure 11A:
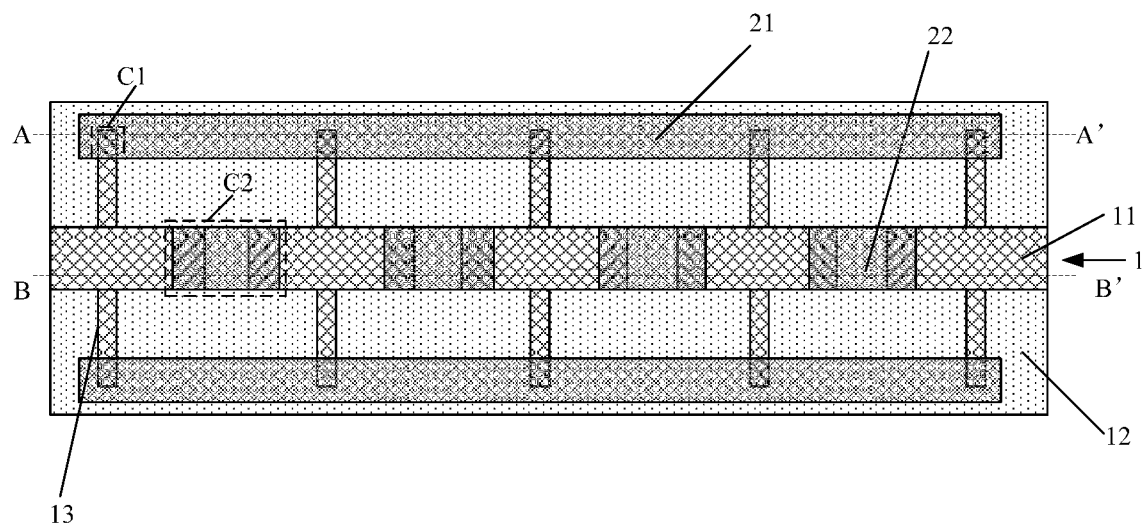
FIGS. 11A and 11B are top views of phase shifters according to some embodiments of the present disclosure.
Figure 11B:
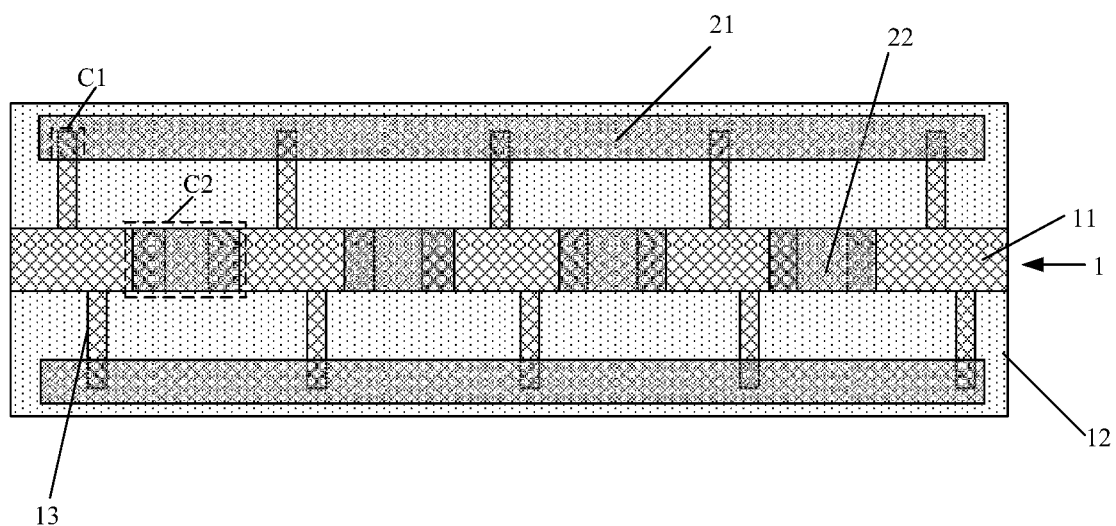
Figure 12:
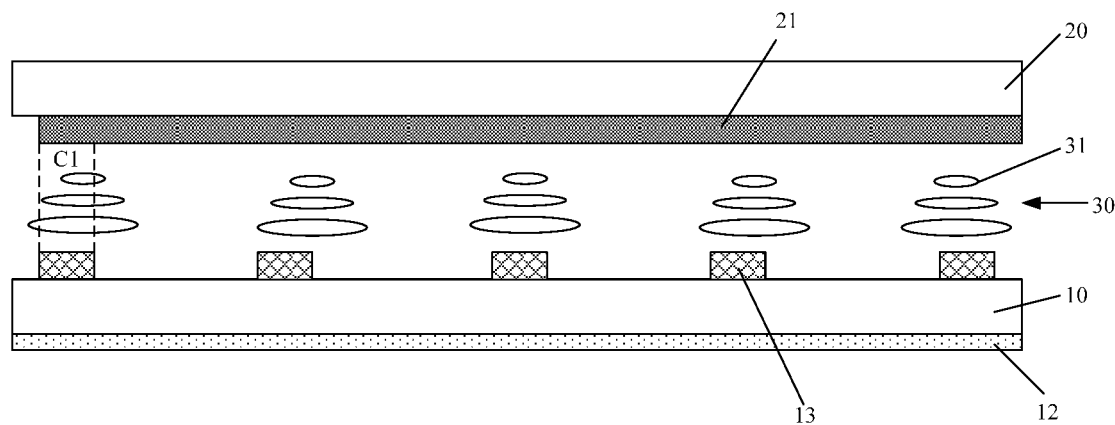
FIG. 12 is a cross-sectional view of the phase shifter shown in FIG. 11A taken along line A-A' in FIG. 11A.
Figure 13:
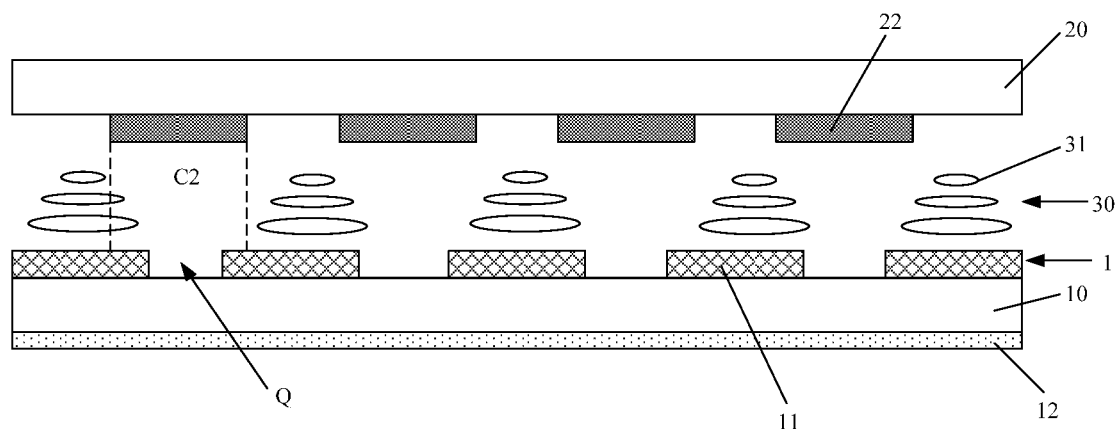
FIG. 13 is a cross-sectional view of the phase shifter shown in FIG. 11A taken along line B-B' in FIG. 11A.

The first substrate may include a first base plate 10, a first electrode at a side of the first base plate 10 proximal to the liquid crystal layer 30, and a ground electrode 12 at a side of the first base plate 10 distal to the liquid crystal layer 30. For example, the first electrode is a microstrip 1, and the microstrip 1 includes a main body structure that includes a first side and a second side which are arranged opposite to each other along the length direction of the main body structure. The microstrip 1 further includes a plurality of branch structures 13 connected to each of the first and second sides of the main body structure and arranged periodically. In order to facilitate control of the phase shifter according to the present embodiment, the plurality of branch structures 13 connected to the first side of the main body structure and the plurality of branch structures 13 connected to the second side of the main body structure may be disposed symmetrically about the length direction of the main body structure, as shown in FIG. 11A. However, the present disclosure is not limited thereto. For example, the plurality of branch structures 13 connected to the first side of the main body structure and the plurality of branch structures 13 connected to the second side of the main body structure may be disposed asymmetrically about the length direction of the main body structure, as shown in FIG. 11B. The main body structure of the microstrip 1 includes a plurality of transmission units 11 periodically arranged along the length direction of the main body structure, and a slit Q is defined between any two adjacent transmission units 11. At least one branch structure 13 may be connected to each of the first and second sides of each transmission unit 11 according to the present embodiment. For ease of description, the following description will be given by taking an example in which one branch structure 13 is connected to each of the first and second sides of each transmission unit. It will be appreciated that since the transmission units 11 are arranged in series along the length of the main body structure, the first and second sides of each transmission unit 11 are the first and second sides of the main body structure.

The second substrate may include a second base plate 20, and a second electrode on the second base plate 20. The second electrode includes a pair of sub-electrodes 21, and one of the pair of sub-electrodes 21 may be referred to as a first sub-electrode 21 and the other may be referred to as a second sub-electrode 21 for ease of description. An orthogonal projection of the first sub-electrode 21 on the first base plate 10 partially overlaps an orthogonal projection of each of the plurality of branch structures 13 connected to the first side of the main body structure on the first base plate 10, and an orthogonal projection of the second sub-electrode 21 on the first base plate 10 partially overlaps an orthogonal projection of each of the plurality of branch structures 13 connected to the second side of the main body structure on the first base plate 10. For example, the length direction of each of the plurality of branch structures 13 connected to each of the first and second sides of the main body structure is perpendicular to the length direction of the microstrip 1. For example, the plurality of branch structures 13 connected to the first side of the main body structure and the plurality of branch structures 13 connected to the second side of the main body structure are symmetrical about the main body structure. A plurality of auxiliary electrodes 22 are further disposed on the second base plate 20, and a location of each of the auxiliary electrodes 22 corresponds to a location of one of the slits Q on the first base plate 10. Further, an orthographic projection of each auxiliary electrode 22 on the first base plate 10 covers the slit Q corresponding to the auxiliary electrode 22 and covers partial regions of two adjacent transmission units 11 defining the slit Q. The auxiliary electrode 22 and the partial regions of the two adjacent transmission units 11 covered by the orthographic projection of the auxiliary electrode 22 on the first base plate 10 form an auxiliary capacitor C2 (as shown in FIG. 14), which is similar to the capacitor C2 shown in the above described figure.

In the phase shifter according to the present embodiment, a transmission structure for a microwave signal is formed by the main body structure of the microstrip 1 and the ground electrode 12, such that a large part of the microwave signal will be transmitted in the first base plate 10, and only a small part of the microwave signal will be transmitted in the liquid crystal layer 30. As described above, a material of the first base plate 10 may include glass, ceramic, and/or the like, which will not absorb a microwave signal substantially, thereby greatly reducing the loss of the microwave signal during transmission. When a first voltage is applied to the microstrip 1 according to the present embodiment and a second voltage different from the first voltage is applied to the pair of sub-electrodes 21 and the plurality of auxiliary electrodes 22 of the second electrode according to the present embodiment, an electric field will be formed between the plurality of branch structures 13 at each side and the sub-electrode 21 disposed opposite to the plurality of branch structures 13, and an electric field will also be formed between the plurality of auxiliary electrodes 22 and the plurality of transmission units 11, which will drive the liquid crystal molecules 31 of the liquid crystal layer 30 to rotate, thereby changing the dielectric constant of the liquid crystal layer 30, and achieving a phase shift of the microwave signal transmitted in the liquid crystal layer 30. The microwave signal in the liquid crystal layer 30 is then transmitted interactively with the microwave signal in the first base plate 10 to achieve a phase shift of the overall microwave signal. In other words, the large part of the microwave signal transmitted in the first base plate 10 and the small part of the microwave signal transmitted in the liquid crystal layer 30 may be subjected to a same phase shift.

Figure 14:
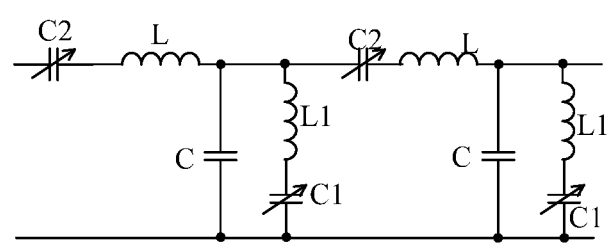
FIG. 14 is an equivalent circuit model of the phase shifter shown in FIGS. 11A to 13.

For example, each transmission unit 11 of the main body structure may be equivalent to one inductor L, each branch structure 13 may be equivalent to one branch inductor L1, the overlapping of each branch structure 13 and the corresponding sub-electrode 21 (e.g., in a direction perpendicular to the first base plate 10 or the second base plate 20) may form a variable capacitor C1, the overlapping of each auxiliary electrode 22 and two adjacent transmission units 11 corresponding to the auxiliary electrode 22 may form an auxiliary capacitor C2, and the overlapping of each transmission unit 11 and the ground electrode 12 may form an overlap capacitor C, as shown in FIG. 14. FIG. 14 is an equivalent circuit model of the phase shifter shown in FIGS. 11A to 13.

It can be seen that the equivalent circuit model (as shown in FIG. 8) of the phase shifter shown in FIGS. 6 and 7 forms a low pass filter. The equivalent circuit model (as shown in FIG. 14) of the phase shifter shown in FIGS. 11A to 13 is equivalent to connecting an auxiliary capacitor C2 in series with the microstrip 1 of the phase shifter shown in FIGS. 6 and 7, and in this case, the equivalent circuit model of the phase shifter shown in FIGS. 11A to 13 forms a combination of a low-pass filter and a high-pass filter, i.e., is equivalent to a band-pass filter. The equivalent circuit model of the phase shifter shown in FIG. 14 is substantially the same as that shown in FIG. 3, except that each variable capacitor C1 is connected in series with a branch inductor L1 in FIG. 14. Further, output characteristic curves of the circuit model shown in FIG. 14 are not significantly different from (i.e., are substantially identical to) the output characteristic curves shown in FIGS. 4 and 5. That is, the phase shifter shown in FIGS. 11A to 13 can also improve the adjustable range of the phase shifter and reduce the loss of the phase shifter in the operating frequency band, thereby increasing the phase shift amount per unit loss.

For example, in the phase shifter shown in FIGS. 11A to 13, the pair of sub-electrodes 21 and the plurality of auxiliary electrodes 22 on the second base plate 20 may be disposed in a same layer, and may be made of a same material. In this case, the pair of sub-electrodes 21 and the plurality of auxiliary electrodes 22 may be formed in one patterning process, thereby increasing the production efficiency of the phase shifter effectively, and saving the cost thereof.

For example, the slits Q between every pair of adjacent two transmission units 11 of the microstrip 1 according to the present embodiment may have a same width, i.e., the periodic arrangement of the plurality of transmission units 11 is made with a constant interval between any adjacent two of the plurality of transmission units 11. However, the periodic arrangement of the plurality of transmission units 11 is not limited thereto, and the plurality of transmission units 11 may also be arranged according to a preset arrangement rule.

For example, in the microstrip 1 according to the present embodiment, a distance between each pair of the branch structures 13 forming each auxiliary capacitor C2 is the same (or is constant), and in this case the periodic arrangement of pairs of the branch structures 13 forming auxiliary capacitors C2 may be made with a constant interval between any two adjacent pairs of the branch structures 13. However, the periodic arrangement of the branch structures 13 is not limited thereto, and the branch structures 13 may also be arranged according to a preset arrangement rule. In addition, in the present embodiment, the branch structure 13 connected to each transmission unit 11 may be an integrally formed structure with the transmission unit 11, i.e., the branch structure 13 connected to each transmission unit 11 and the transmission unit 11 may be formed in one process, thereby simplifying the preparation process and saving the cost thereof.

For example, each of the first base plate 10 and the second base plate 20 may be a glass substrate having a thickness of 100 µm to 1000 µm, a sapphire substrate, a polyethylene terephthalate substrate having a thickness of 10 µm to 500 µm, a triallyl cyanurate substrate, and/or a transparent flexible polyimide substrate. For example, each of the first base plate 10 and the second base plate 20 may be high-purity quartz glass having extremely low dielectric loss. The first base plate 10 and the second base plate 20 made of the high-purity quartz glass may effectively reduce loss of the microwave, compared to a general glass substrate, such that the phase shifter may have low power consumption and a high signal-to-noise ratio. For example, the high-purity quartz glass may be quartz glass in which the weight percentage of $SiO_2$ is 99.9% or more.

For example, each of a material of each transmission unit 11 of the microstrip 1, a material of each branch structure 13 of the microstrip 1, a material of the ground electrode 12, a material of each sub-electrode 21, and a material of each auxiliary electrode 22 may include aluminum, silver, gold, chromium, molybdenum, nickel, iron, or the like. Further, each transmission element 11 in the microstrip 1 may be made of a transparent conductive oxide.

For example, the liquid crystal molecules 31 of the liquid crystal layer 30 may be positive liquid crystal molecules 31 or negative liquid crystal molecules 31. It should be noted that, in the present embodiment of the present disclosure, in a case where the liquid crystal molecules 31 are positive liquid crystal molecules 31, an angle between a long axis direction of each liquid crystal molecule 31 and a plane where the first base plate 10 or the second base plate 20 is located is greater than 0 degree and less than or equal to 45 degrees. In a case where the liquid crystal molecules 31 are negative liquid crystal molecules 31, the angle between the long axis direction of each liquid crystal molecule 31 and the plane where the first base plate 10 or the second base plate 20 is located is greater than 45 degrees and smaller than 90 degrees, in the present embodiment of the present disclosure. With such configuration, the dielectric constant of the liquid crystal layer 30 will be changed after the liquid crystal molecules 31. are driven to rotate, thereby achieving the purpose of phase shifting.

Figure 15:
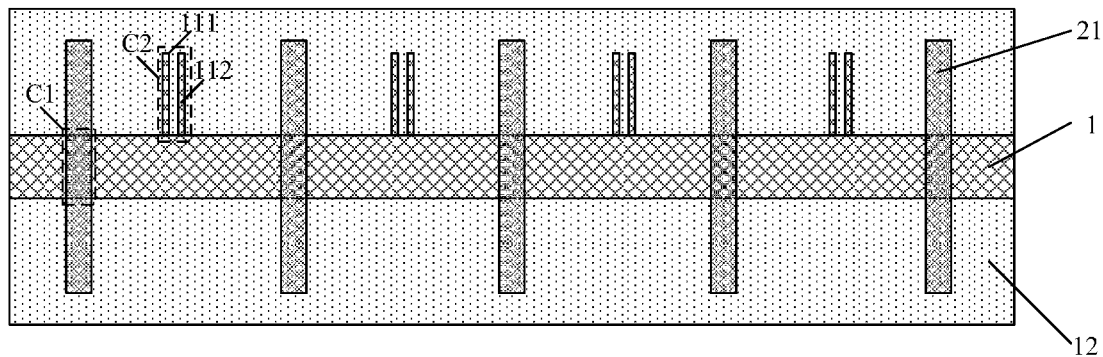
FIG. 15 is a top view of a phase shifter according to an embodiment of the present disclosure.
Figure 16:
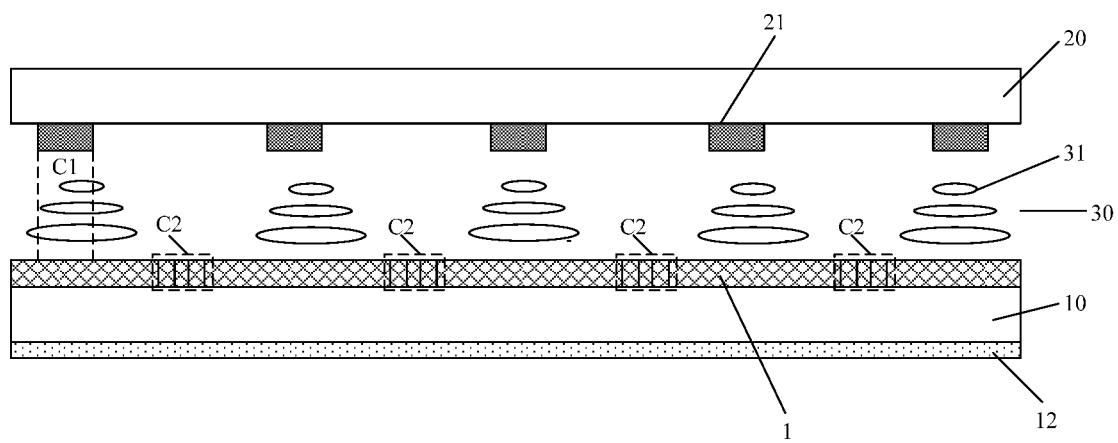
FIG. 16 is a side view of the phase shifter shown in FIG. 15.

As shown in FIGS. 15 and 16, an embodiment of the present disclosure provides a phase shifter including first and second substrates disposed opposite to each other, and a liquid crystal layer 30 located between the first and second substrates.

The first substrate may include a first base plate 10, a first electrode at a side of the first base plate 10 proximal to the liquid crystal layer 30, and a ground electrode 12 at a side of the first base plate 10 distal to the liquid crystal layer 30. The first electrode is, for example, a microstrip 1. A plurality of auxiliary capacitors C2 are further disposed on the first base plate 10, and a first pole piece 111 and a second pole piece 112 of each auxiliary capacitor C2 are both connected to the microstrip 1. It should be noted that the first pole piece 111 and the second pole piece 112 of each auxiliary capacitor C2 are disposed opposite to each other, so it can be understood that the first pole piece 111 and the second pole piece 112 of each auxiliary capacitor C2 may be connected to a same side of the microstrip 1, as shown in FIG. 15.

The second substrate may include a second base plate 20, and a second electrode located at a side of the second base plate 20 proximal to the liquid crystal layer 30. The second electrode includes a plurality of sub-electrodes 21 arranged periodically, and an orthographic projection of each sub-electrode 21 on the first base plate 10 at least partially overlaps an orthographic projection of the microstrip 1 on the first base plate 10. A region defined by an orthographic projection of any two adjacent sub-electrodes 21 on the first base plate 10 is provided with one auxiliary capacitor C2 therein. For example, a length direction (e.g., a vertical direction in FIG. 15) of each of the plurality of sub-electrodes 21 and a length direction (e.g., a horizontal direction in FIG. 15) of the microstrip 1 are perpendicular to each other. In this way, the phase shifter is easier to be designed and manufactured.

In the phase shifter according to the present embodiment, the microstrip 1 and the ground electrode 12 form a transmission structure for a microwave signal, such that a large part of the microwave signal is transmitted in the first base plate 10 and only a small part of the microwave signal is transmitted in the liquid crystal layer 30. As described above, a material of the first base plate 10 may include glass, ceramic, or the like, which does not absorb the microwave signal substantially, thereby reducing the loss of the microwave signal during transmission greatly. When a first voltage is applied to the microstrip 1 and a second voltage different from the first voltage is applied to the sub-electrode 21 of the phase shifter according to the present embodiment, an electric field will be generated between a layer where the microstrip 1 is located and a layer where the sub-electrodes 21 are located, and the generated electric field will drive the liquid crystal molecules 31 of the liquid crystal layer 30 to rotate, thereby changing the dielectric constant of the liquid crystal layer 30, and achieving a phase shift of the microwave signal transmitted in the liquid crystal layer 30. The microwave signal in the liquid crystal layer 30 is then transmitted interactively with the microwave signal in the first base plate 10 to achieve a phase shift of the overall microwave signal. In other words, the large part of the microwave signal transmitted in the first base plate 10 and the small part of the microwave signal transmitted in the liquid crystal layer 30 may be subjected to a same phase shift.

Figure 17:
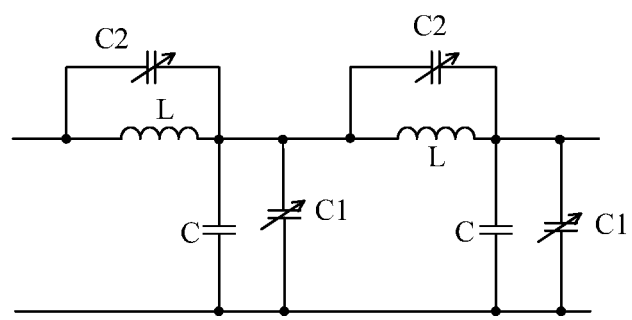
FIG. 17 is an equivalent circuit model of the phase shifter shown in FIGS. 15 and 16.

For example, a portion of the microstrip 1 located between the orthographic projections of any two adjacent sub-electrodes 21 on the first base plate 10 may be equivalent to an inductor L, the overlapping of the microstrip 1 and each sub-electrodes 21 forms a variable capacitor C1, each pair of the first pole piece 111 and the second pole piece 112 connected to the microstrip 1 forms an auxiliary capacitor C2, and a portion of the microstrip 1 located between the orthographic projections of any two adjacent sub-electrodes 21 on the first base plate 10 overlaps the ground electrode 12 to form an overlap capacitor C, as shown in FIG. 17. FIG. 17 is an equivalent circuit model of the phase shifter shown in FIGS. 15 and 16.

It can be seen that the equivalent circuit model (as shown in FIG. 8) of the phase shifter shown in FIGS. 6 and 7 form a low pass filter, the equivalent circuit model (as shown in FIG. 17) of the phase shifter shown in FIGS. 15 and 16 is equivalent to connecting an auxiliary capacitor C2 in parallel with the microstrip 1 of the phase shifter shown in FIGS. 6 and 7, such that the equivalent circuit model of the phase shifter shown in FIG. 17 form a combination of a low-pass filter and a high-pass filter, i.e., is equivalent to a band-pass filter. The equivalent circuit model of the phase shifter shown in FIG. 14 is substantially the same as that shown in FIG. 3, except that in FIG. 14, the auxiliary capacitor C2 is connected in parallel with the microstrip 1, but in FIG. 3, the auxiliary capacitor C2 is connected in series with the microstrip 1. However, the output characteristic curves of the circuit model shown in FIG. 14 are not substantially different from (are substantially identical to) those shown in FIGS. 4 and 5. That is, the phase shifters shown in FIGS. 15 and 16 can also improve the adjustable range of the phase shifter and reduce the loss of the phase shifter in the operating frequency band, thereby increasing the phase shift amount per unit loss.

For example, in the phase shifters shown in FIG. 15 and FIG. 16, the microstrip 1 and both the first pole piece 111 and the second pole piece 112 of each of the plurality of auxiliary capacitors C2 on the first base plate 10 may be an integrally formed structure, i.e., may be disposed in a same layer, and may be made of a same material. Thus, the microstrip 1 and both the first pole piece 111 and the second pole piece 112 of each of the plurality of auxiliary capacitors C2 may be formed by one process, to reduce the cost of the process.

For example, in the present embodiment, distances between every pair of adjacent sub-electrodes 21 of the second electrode may be equal to each other, i.e., the periodic arrangement of the sub-electrodes 21 is made with a constant interval therebetween. However, the periodic arrangement of the sub-electrodes 21 is not limited thereto, and the sub-electrodes 21 may also be arranged according to a preset arrangement rule.

For example, the length direction of each sub-electrode 21 and the length direction of the microstrip 1 may be perpendicular to each other, so as to ensure that there is a sufficiently large overlapping area between the microstrip 1 and the plurality of sub-electrodes 21. Thus, after a first voltage is applied to the microstrip 1 and a second voltage different from the first voltage is applied to the plurality of sub-electrodes 21, the generated electric field will drive the liquid crystal molecules 31 to rotate, thereby changing the dielectric constant of the liquid crystal layer 30, and achieving a phase shift of a microwave signal.

For example, each of the first base plate 10 and the second base plate 20 may be a glass substrate having a thickness of 100 µm to 1000 µm, a sapphire substrate, a polyethylene terephthalate substrate having a thickness of 10 µm to 500 µm, a triallyl cyanurate substrate, and/or a transparent flexible polyimide substrate. For example, each of the first base plate 10 and the second base plate 20 may be high-purity quartz glass having extremely low dielectric loss. Compared with a general glass substrate, the first base plate 10 and the second base plate 20 made of the high-purity quartz glass may effectively reduce loss of the microwave, such that the phase shifter may have low power consumption and a high signal-to-noise ratio. For example, the high-purity quartz glass may be quartz glass in which the weight percentage of $SiO_2$ is 99.9% or more.

For example, each of a material of the microstrip 1, a material of the ground electrode 12, a material of each sub-electrode 21, and a material of the first pole piece 111 and the second pole piece 112 of each auxiliary capacitor C2 may include metal such as aluminum, silver, gold, chromium, molybdenum, nickel, or iron. Further, the microstrip 1 may also be made of a transparent conductive oxide.

For example, the liquid crystal molecules 31 of the liquid crystal layer 30 may be positive liquid crystal molecules 31 or negative liquid crystal molecules 31. It should be noted that, in the present embodiment of the present disclosure, in a case where the liquid crystal molecules 31 are positive liquid crystal molecules 31, an angle between a long axis direction of each liquid crystal molecule 31 and a plane where the first base plate 10 or the second base plate 20 is located is greater than 0 degree and less than or equal to 45 degrees. In a case where the liquid crystal molecules 31 are negative liquid crystal molecules 31, the angle between the long axis direction of each liquid crystal molecule 31 and the plane where the first base plate 10 or the second base plate 20 is located is greater than 45 degrees and smaller than 90 degrees, in the present embodiment of the present disclosure. With such configuration, after the liquid crystal molecules 31 are driven to rotate, the dielectric constant of the liquid crystal layer 30 is changed, thereby achieving the purpose of phase shifting.

Since the phase shifters provided by the above embodiments all achieve a phase shifting function by changing the dielectric constant of the liquid crystal layer, the phase shifters may be referred to as liquid crystal phase shifters.

An embodiment of the present disclosure provides a liquid crystal antenna including the liquid crystal phase shifter according to any one of the above embodiments. For example, at least two patches (or patch units) may be further disposed on a side of the second base plate 20 distal to the liquid crystal layer 30, and a gap between each two of the at least two patches corresponds to a gap between two adjacent sub-electrodes 21 corresponding to the two patches. In this way, the microwave signal after being phase-adjusted by the phase shifter according to any one of the above embodiments may be radiated outwards through the gap between the patch elements.

In addition, the liquid crystal antenna may further include a feeding interface for feeding a microwave signal in a cable to the microwave transmission structure (e.g., the microstrip 1). The liquid crystal antenna has reduced loss and improved efficiency.

An embodiment of the present disclosure provides a communication device including the liquid crystal antenna according to the above embodiment. The communication device has reduced loss and improved efficiency.

An embodiment of the present disclosure provides a method for operating a liquid crystal phase shifter, wherein the liquid crystal phase shifter may be the liquid crystal phase shifter according to any one of the above embodiments, and the method may include: applying a first voltage to the first electrode; and applying a second voltage different from the first voltage to the second electrode, to generate an electric field between the first electrode and the second electrode, for causing the long axes of the liquid crystal molecules 31 of the liquid crystal layer 30 to be substantially parallel (for positive liquid crystal molecules) or substantially perpendicular (for negative liquid crystal molecules) to a direction of the electric field.

The foregoing embodiments of the present disclosure may be combined with each other without explicit conflict.

It should be understood that the above embodiments are merely exemplary embodiments for explaining the principle of the present disclosure, and the present disclosure is not limited thereto. It will be apparent to one of ordinary skill in the art that various changes and modifications may be made thereto without departing from the spirit and essence of the present disclosure, and these changes and modifications also fall within the scope of the present disclosure.

What is claimed is:

1. A phase shifter, comprising:
a first substrate and a second substrate opposite to each other, and a liquid crystal layer between the first substrate and the second substrate; wherein
the first substrate comprises a first base plate and a first electrode at a side of the first base plate proximal to the liquid crystal layer;
the second substrate comprises a second base plate and a second electrode at a side of the second base plate proximal to the liquid crystal layer, wherein the second electrode and the first electrode form a main capacitor; and
the phase shifter further comprises an auxiliary capacitor connected to the first electrode,
wherein the first electrode comprises a microstrip; and the second electrode comprises a plurality of sub-electrodes arranged periodically, and an orthogonal projection of the microstrip on the first base plate at least partially overlaps an orthogonal projection of each of the plurality of sub-electrodes on the first substrate, and
wherein the microstrip comprises a plurality of transmission units periodically and sequentially arranged along a length direction of the microstrip, and any adjacent two of the plurality of transmission units define a slit;
a plurality of auxiliary electrodes, which are in one-to-one correspondence with a plurality of slits between every adjacent two of the plurality of transmission units, are arranged on the side of the second base plate proximal to the liquid crystal layer;
an orthogonal projection of each of the plurality of auxiliary electrodes on the first substrate covers a corresponding slit and covers partial regions of two adjacent transmission units defining the corresponding slit; and
each auxiliary electrode and the partial regions of the two adjacent transmission units covered by the orthogonal projection of the auxiliary electrode on the first base plate form the auxiliary capacitor.

2. The phase shifter according to claim 1, wherein the plurality of auxiliary electrodes and the plurality of sub-electrodes are in a same layer and comprise a same material.

3. The phase shifter according to claim 1, wherein a length direction of each of the plurality of sub-electrodes and a length direction of the microstrip are perpendicular to each other.

4. The phase shifter according to claim 1, further comprising a ground electrode on a side of the first base plate distal to the liquid crystal layer.

5. The phase shifter according to claim 1, wherein a material of the first substrate comprises at least one of glass, ceramic, and high-purity quartz glass.

6. The phase shifter according to claim 1, wherein the liquid crystal layer comprises positive liquid crystal molecules, and an angle between a long axis direction of each of the positive liquid crystal molecules and a plane where the first base plate is located is greater than 0 degree and equal to or less than 45 degrees; or
wherein the liquid crystal layer comprises negative liquid crystal molecules, and an angle between a long axis direction of each of the negative liquid crystal molecules and a plane where the first base plate is located is greater than 45 degrees and smaller than 90 degrees.

7. The phase shifter according to claim 1, wherein the phase shifter is configured to phase shift a signal having a frequency in any one of a frequency band from 2 GHz to 5 GHz and a frequency band from 12 GHz to 18 GHz.

8. A liquid crystal antenna comprising the phase shifter according to claim 1.

9. A phase shifter, comprising: a first substrate and a second substrate opposite to each other, and a liquid crystal layer between the first substrate and the second substrate; wherein
the first substrate comprises a first base plate and a first electrode at a side of the first base plate proximal to the liquid crystal layer;

the second substrate comprises a second base plate and a second electrode at a side of the second base plate proximal to the liquid crystal layer, wherein the second electrode and the first electrode form a main capacitor, and the phase shifter further comprises an auxiliary capacitor connected to the first electrode, wherein the first electrode comprises a microstrip, and the second electrode comprises a plurality of sub-electrodes arranged periodically, and an orthogonal projection of the microstrip on the first base plate at least partially overlaps an orthogonal projection of each of the plurality of sub-electrodes on the first substrate, and wherein both a first pole plate and a second pole plate of each of a plurality of auxiliary capacitors respectively corresponding to the plurality of auxiliary electrodes an connected to the microstrip.

10. The phase shifter according to claim 9, wherein both the first pole plate and the second pole plate of each of the plurality of auxiliary capacitors are connected to a same side of the microstrip.

11. The phase shifter according to claim 9, wherein one of the plurality of auxiliary capacitors is in a region defined by orthogonal projections of any adjacent two of the plurality of sub-electrodes on the first base plate.

12. The phase shifter according to claim 9, wherein the first and second pole plates of the plurality of auxiliary capacitors and the microstrip are an integrally formed structure.

13. The phase shifter according to claim 9, wherein a length direction of each of the plurality of sub-electrodes and a length direction of the microstrip are perpendicular to each other.

14. A liquid crystal antenna comprising the phase shifter according to claim 9.

15. A phase shifter, comprising: a first substrate and a second substrate opposite to each other, and a liquid crystal layer between the first substrate and the second substrate; wherein the first substrate comprises a first base plate and a first electrode as a side of the first base plate proximal to the liquid crystal layer;

the second substrate comprises a second base plate and a second electrode at a side of the second base plate proximal to the liquid crystal layer, wherein the second electrode and the first electrode form a main capacitor, and the phase shifter further comprises an auxiliary capacitor connected to the first electrode, and wherein the first electrode comprises a microstrip that comprises a main body structure, the main body structure comprises a first side and a second side arranged opposite to each other along a length direction of the main body structure; and a plurality of branch structures are connected to each of the first and second sides of the main body structure and are arranged periodically.

16. The phase shifter according to claim 15, wherein the second electrode comprises a pair of sub-electrodes; an orthogonal projection of each sub-electrode of the pair of sub-electrodes on the first base plate partially overlaps an orthogonal projection, on the first base plate, of each of the plurality of branch structures connected to a corresponding side of the main body structure.

17. The phase shifter according to claim 16, wherein the main body structure comprises a plurality of transmission units periodically and sequentially arranged along a length direction of the main body structure; any adjacent two of the plurality of transmission units define a slit; and each of the plurality of transmission units is connected with the branch structures;

a plurality of auxiliary electrodes, which are in one-to-one correspondence with a plurality of slits between every adjacent two of the plurality of transmission units, are arranged on a side of the second base plate proximal to the liquid crystal layer;

an orthogonal projection of each of the plurality of auxiliary electrodes on the first base plate covers a corresponding slit and covers partial regions of two adjacent transmission units defining the corresponding slit; and each auxiliary electrode and the partial regions of the two adjacent transmission units covered by the orthogonal projection of the auxiliary electrode on the first base plate form the auxiliary capacitor.

18. The phase shifter according to claim 17, wherein the plurality of auxiliary electrodes and the pair of sub-electrodes are in a same layer and comprise a same material.

19. The phase shifter according to claim 15, wherein a length direction of each of the plurality of branch structures at each of the first side and the second side of the main body structure is perpendicular to a length direction of the microstrip.

20. The phase shifter according to claim 15, wherein the plurality of branch structures at the first side of the main body structure and the plurality of branch structures at the second side of the main body structure are symmetric about the main body structure.

* * * * *